United States Patent
Banton et al.

(10) Patent No.: US 7,502,145 B2
(45) Date of Patent: Mar. 10, 2009

(54) SYSTEMS AND METHODS FOR IMPROVED LINE EDGE QUALITY

(75) Inventors: Martin Edward Banton, Fairport, NY (US); Daniel Fleysher, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 805 days.

(21) Appl. No.: 11/018,530

(22) Filed: Dec. 22, 2004

(65) Prior Publication Data

US 2006/0132850 A1    Jun. 22, 2006

(51) Int. Cl.
 *H04N 1/405* (2006.01)
(52) U.S. Cl. .................. 358/3.27; 358/3.15
(58) Field of Classification Search ........... 358/3.27, 358/3.14, 3.21, 1.13, 2.99, 3.01, 2.1, 2.15
 See application file for complete search history.

(56) References Cited

U.S. PATENT DOCUMENTS

| | | | |
|---|---|---|---|
| 4,893,188 A | 1/1990 | Murakami et al. | |
| 5,682,249 A | 10/1997 | Harrington et al. | |
| 5,862,257 A | 1/1999 | Sekine et al. | |
| 5,886,797 A | 3/1999 | Shimura | |
| 5,896,489 A | 4/1999 | Wada | |
| 6,181,829 B1 | 1/2001 | Clark et al. | |
| 6,476,934 B1 | 11/2002 | Ilbery et al. | |
| 6,754,381 B2 | 6/2004 | Kuwata | |
| 6,757,081 B1 | 6/2004 | Fan et al. | |
| 7,151,863 B1 * | 12/2006 | Bradley et al. | 382/299 |
| 2002/0105676 A1 * | 8/2002 | Fujiwara et al. | 358/1.15 |
| 2004/0114158 A1 | 6/2004 | Klassen et al. | |

* cited by examiner

*Primary Examiner*—Thomas D Lee
*Assistant Examiner*—Stephen M Brinich
(74) *Attorney, Agent, or Firm*—Oliff & Berridge, PLC

(57) ABSTRACT

Systems and methods for improving image quality of image data to be rendered may be provided using multiple mask MRC files. Such a method may involve processing a first binary bit map of image data to generate a processed binary bit map, assigning an edge tag to at least one pixel in the processed binary bit map, and assigning a gray/color value to at least one pixel in the processed binary bit map based on values of corresponding pixels in the first binary bit map. A system may include a processor that performs such processing and assigning, an image data source that supplies image data of an original image, and an image rendering device that provides a rendered image of the original image based on the at least one assigned edge tag and the at least one assigned gray/color value.

19 Claims, 20 Drawing Sheets

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 |
| 0 | 0 | 0 | 0 | 0 | 1 | 1 | 1 | 1 | 1 | 1 | 1 | 1 | 1 | 1 | 1 | 1 | 1 | 0 | 0 | 0 | 0 | 0 | 0 |
| 0 | 0 | 0 | 0 | 0 | 1 | 1 | 1 | 1 | 1 | 1 | 1 | 1 | 1 | 1 | 1 | 1 | 1 | 0 | 0 | 0 | 0 | 0 | 0 |
| 0 | 0 | 0 | 0 | 0 | 1 | 1 | 1 | 1 | 1 | 1 | 1 | 1 | 1 | 1 | 1 | 1 | 1 | 0 | 0 | 0 | 0 | 0 | 0 |
| 0 | 0 | 0 | 0 | 0 | 1 | 1 | 1 | 1 | 1 | 1 | 1 | 1 | 1 | 1 | 1 | 1 | 1 | 0 | 0 | 0 | 0 | 0 | 0 |
| 0 | 0 | 0 | 0 | 0 | 1 | 1 | 1 | 1 | 1 | 1 | 1 | 1 | 1 | 1 | 1 | 1 | 1 | 0 | 1 | 0 | 0 | 0 | 0 |
| 0 | 0 | 0 | 0 | 0 | 1 | 1 | 1 | 1 | 1 | 1 | 1 | 1 | 1 | 1 | 1 | 1 | 1 | 0 | 0 | 0 | 0 | 0 | 0 |
| 0 | 0 | 0 | 0 | 0 | 1 | 1 | 1 | 1 | 1 | 1 | 1 | 1 | 1 | 1 | 1 | 1 | 1 | 0 | 0 | 0 | 0 | 0 | 0 |
| 0 | 0 | 0 | 0 | 0 | 1 | 1 | 1 | 1 | 1 | 1 | 1 | 1 | 1 | 1 | 1 | 1 | 1 | 0 | 0 | 0 | 0 | 0 | 0 |
| 0 | 0 | 0 | 0 | 0 | 1 | 1 | 1 | 1 | 1 | 1 | 1 | 1 | 1 | 1 | 1 | 1 | 1 | 1 | 0 | 0 | 0 | 0 | 0 |
| 0 | 0 | 0 | 0 | 0 | 0 | 1 | 1 | 1 | 1 | 1 | 1 | 1 | 1 | 1 | 1 | 1 | 1 | 1 | 0 | 0 | 0 | 0 | 0 |
| 0 | 0 | 0 | 0 | 0 | 0 | 1 | 1 | 1 | 1 | 1 | 1 | 1 | 1 | 1 | 1 | 1 | 1 | 1 | 0 | 0 | 0 | 0 | 0 |
| 0 | 0 | 0 | 0 | 0 | 0 | 0 | 0 | 0 | 1 | 1 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 1 | 1 | 1 | 0 | 0 | 0 | 0 | 0 | 0 | 0 | 0 | 0 | 0 | 0 |
| 0 | 0 | 0 | 0 | 0 | 0 | 0 | 1 | 1 | 1 | 1 | 0 | 1 | 1 | 1 | 1 | 1 | 0 | 0 | 0 | 0 | 0 | 0 | 0 |
| 0 | 0 | 0 | 0 | 1 | 1 | 1 | 1 | 0 | 0 | 0 | 0 | 0 | 0 | 0 | 0 | 1 | 1 | 1 | 0 | 0 | 0 | 0 | 0 |
| 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 1 | 1 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 1 | 1 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 1 | 1 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 1 | 1 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 1 | 1 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 | 1 | 0 | 0 | 0 | 0 | 0 | 0 |
| 0 | 0 | 0 | 0 | 1 | 1 | 0 | 0 | 0 | 0 | 0 | 0 | 0 | 0 | 0 | 0 | 1 | 0 | 1 | 1 | 0 | 0 | 0 | 0 |
| 0 | 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 |
| 0 | 0 | 0 | 0 | 0 | 1 | 1 | 1 | 1 | 0 | 0 | 1 | 1 | 1 | 1 | 1 | 0 | 1 | 1 | 1 | 0 | 0 | 0 | 0 |
| 0 | 0 | 0 | 0 | 0 | 0 | 0 | 1 | 1 | 1 | 1 | 0 | 0 | 0 | 1 | 1 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

*FIG. 3*

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 0 | 1 | 1 | 0 | 0 | 0 | 0 | 0 |
| 0 | 0 | 1 | 1 | 1 | 1 | 1 | 1 | 1 | 1 | 0 | 0 |
| 0 | 1 | 1 | 0 | 0 | 0 | 0 | 0 | 0 | 1 | 0 | 0 |
| 0 | 1 | 1 | 0 | 0 | 0 | 0 | 0 | 0 | 1 | 0 | 0 |
| 0 | 0 | 1 | 0 | 0 | 0 | 0 | 0 | 0 | 1 | 1 | 0 |
| 0 | 0 | 1 | 0 | 0 | 0 | 0 | 0 | 0 | 1 | 0 | 0 |
| 0 | 0 | 1 | 0 | 0 | 0 | 0 | 0 | 0 | 1 | 0 | 0 |
| 0 | 0 | 1 | 1 | 1 | 1 | 1 | 1 | 1 | 1 | 0 | 0 |
| 0 | 0 | 0 | 0 | 1 | 1 | 0 | 1 | 1 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

| 0 | 0 | 0   | 0   | 0   | 0   | 0   | 0   | 0   | 0   | 0 | 0 |
|---|---|-----|-----|-----|-----|-----|-----|-----|-----|---|---|
| 0 | 0 | 0   | 0   | 0   | 128 | 64  | 0   | 0   | 0   | 0 | 0 |
| 0 | 0 | 128 | 192 | 255 | 255 | 255 | 255 | 192 | 64  | 0 | 0 |
| 0 | 64| 255 | 255 | 255 | 255 | 255 | 255 | 255 | 128 | 0 | 0 |
| 0 | 64| 255 | 255 | 255 | 255 | 255 | 255 | 255 | 128 | 0 | 0 |
| 0 | 0 | 255 | 255 | 255 | 255 | 255 | 255 | 255 | 192 | 0 | 0 |
| 0 | 0 | 255 | 255 | 255 | 255 | 255 | 255 | 255 | 128 | 0 | 0 |
| 0 | 0 | 255 | 255 | 255 | 255 | 255 | 255 | 255 | 128 | 0 | 0 |
| 0 | 0 | 128 | 255 | 255 | 255 | 255 | 255 | 255 | 128 | 0 | 0 |
| 0 | 0 | 0   | 0   | 128 | 128 | 0   | 64  | 128 | 0   | 0 | 0 |
| 0 | 0 | 0   | 0   | 0   | 0   | 0   | 0   | 0   | 0   | 0 | 0 |
| 0 | 0 | 0   | 0   | 0   | 0   | 0   | 0   | 0   | 0   | 0 | 0 |

FIG. 6

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 | 0 | 0 | 0 |
| 0 | 0 | 1 | 1 | 1 | 1 | 1 | 1 | 1 | 1 | 1 | 1 | 1 | 1 | 1 | 0 |
| 0 | 0 | 0 | 1 | 1 | 1 | 1 | 1 | 1 | 1 | 1 | 1 | 1 | 1 | 1 | 0 |
| 0 | 0 | 0 | 0 | 0 | 1 | 1 | 1 | 1 | 1 | 1 | 1 | 1 | 1 | 1 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 7

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1 | 1 | 1 | 1 | 1 | 1 | 1 | 1 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 8

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 | 0 | 0 | 0 |
| 0 | 0 | 1 | 1 | 1 | 1 | 1 | 1 | 1 | 1 | 1 | 1 | 1 | 1 | 1 | 0 |
| 0 | 0 | 0 | 1 | 1 | 1 | 0 | 0 | 0 | 0 | 0 | 0 | 0 | 0 | 1 | 0 |
| 0 | 0 | 0 | 0 | 0 | 1 | 1 | 1 | 1 | 1 | 1 | 1 | 1 | 1 | 1 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

90

| 0 | 0 | 0 | 0 | 0 | 0 | 0 | 0 |
|---|---|---|---|---|---|---|---|
| 0 | 1 | 1 | 1 | 1 | 1 | 1 | 1 |
| 0 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |

| 0 | 0 | 0 | 0 | 0 | 0 | 0 | 0 |
|---|---|---|---|---|---|---|---|
| 0 | 255 | 128 | 128 | 128 | 128 | 128 | 64 |
| 0 | 64 | 192 | 255 | 255 | 255 | 255 | 128 |
| 0 | 0 | 0 | 0 | 0 | 0 | 0 | 0 |
| 0 | 0 | 0 | 0 | 0 | 0 | 0 | 0 |

| 120 | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 1 | 1 | 1 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 1 | 1 | 1 | 0 | 0 | 0 | 1 | 1 | 1 | 0 | 0 | 0 | 0 | 0 | 0 | 0 | 0 | 0 | 0 | 0 | 0 | 0 | 0 | 0 |
| 0 | 0 | 0 | 0 | 1 | 1 | 1 | 1 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 0 | 0 | 1 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 0 | 0 | 0 | 0 | 0 | 1 | 1 | 0 | 0 | 0 | 0 | 1 | 1 | 1 | 0 | 0 | 0 | 1 | 0 | 1 | 0 | 0 | 0 | 0 | 0 | 0 | 0 | 0 | 0 | 0 | 0 | 0 |
| 0 | 0 | 0 | 0 | 0 | 0 | 0 | 1 | 1 | 1 | 1 | 0 | 0 | 0 | 1 | 1 | 1 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

*FIG. 13*

| 130 → | | | | | | | | | | | | | | | | | | | | |
|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 1 | 1 | 1 | 0 | 0 | 0 | 0 | 0 | 0 | 0 |
| 0 | 0 | 0 | 0 | 0 | 0 | 0 | 1 | 1 | 0 | 0 | 1 | 1 | 1 | 1 | 1 | 0 | 0 | 0 | 0 | 0 |
| 0 | 0 | 0 | 0 | 0 | 1 | 1 | 0 | 0 | 0 | 0 | 0 | 0 | 0 | 0 | 1 | 1 | 1 | 0 | 0 | 0 |
| 0 | 0 | 0 | 0 | 1 | 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 | 0 |
| 0 | 0 | 0 | 1 | 0 | 0 | 0 | 0 | 0 | 0 | 0 | 0 | 0 | 0 | 0 | 0 | 1 | 0 | 0 | 0 | 0 |
| 0 | 0 | 0 | 1 | 1 | 0 | 0 | 0 | 0 | 0 | 0 | 0 | 0 | 0 | 0 | 0 | 1 | 0 | 0 | 0 | 0 |
| 0 | 0 | 0 | 0 | 1 | 0 | 0 | 0 | 0 | 0 | 0 | 0 | 0 | 0 | 0 | 0 | 1 | 1 | 0 | 0 | 0 |
| 0 | 0 | 0 | 0 | 1 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 | 0 |
| 0 | 0 | 0 | 1 | 1 | 0 | 0 | 0 | 0 | 0 | 0 | 0 | 0 | 0 | 0 | 0 | 1 | 1 | 0 | 0 | 0 |
| 0 | 0 | 0 | 0 | 1 | 0 | 0 | 0 | 0 | 0 | 0 | 0 | 0 | 0 | 0 | 0 | 0 | 1 | 0 | 0 | 0 |
| 0 | 0 | 0 | 0 | 1 | 0 | 0 | 0 | 0 | 0 | 0 | 0 | 0 | 0 | 0 | 0 | 0 | 1 | 1 | 0 | 0 |
| 0 | 0 | 0 | 0 | 1 | 1 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 | 1 | 0 | 0 | 0 |
| 0 | 0 | 0 | 0 | 0 | 1 | 1 | 1 | 1 | 0 | 0 | 0 | 1 | 1 | 1 | 0 | 0 | 1 | 0 | 0 | 0 |
| 0 | 0 | 0 | 0 | 0 | 0 | 1 | 1 | 1 | 0 | 0 | 0 | 1 | 1 | 1 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |

| 150 → | | | | | | | | | | | | | | | | | | | | | |
|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 1 | 1 | 1 | 0 | 0 | 0 | 0 | 0 | 0 | 0 | 0 | 0 |
| 0 | 0 | 0 | 0 | 0 | 0 | 0 | 1 | 1 | 1 | 1 | 0 | 0 | 0 | 1 | 1 | 1 | 0 | 0 | 0 | 0 | 0 |
| 0 | 0 | 0 | 0 | 1 | 1 | 1 | 1 | 0 | 0 | 0 | 0 | 0 | 0 | 0 | 0 | 0 | 1 | 0 | 0 | 0 | 0 |
| 0 | 0 | 0 | 0 | 1 | 0 | 0 | 0 | 0 | 0 | 0 | 0 | 0 | 0 | 0 | 0 | 0 | 1 | 0 | 0 | 0 | 0 |
| 0 | 0 | 0 | 1 | 1 | 0 | 0 | 0 | 0 | 0 | 0 | 0 | 0 | 0 | 0 | 0 | 0 | 1 | 0 | 0 | 0 | 0 |
| 0 | 0 | 0 | 1 | 0 | 0 | 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 0 | 0 | 0 | 1 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 1 | 1 | 0 | 0 | 0 |
| 0 | 0 | 0 | 1 | 1 | 0 | 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 1 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 1 | 1 | 0 | 0 | 0 |
| 0 | 0 | 0 | 0 | 1 | 0 | 0 | 0 | 0 | 0 | 0 | 0 | 0 | 0 | 0 | 0 | 0 | 1 | 0 | 0 | 0 | 0 |
| 0 | 0 | 0 | 0 | 0 | 1 | 1 | 0 | 0 | 0 | 1 | 1 | 1 | 0 | 0 | 1 | 1 | 1 | 0 | 0 | 0 | 0 |
| 0 | 0 | 0 | 0 | 0 | 0 | 0 | 0 | 1 | 1 | 1 | 1 | 0 | 0 | 0 | 1 | 1 | 1 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 1 | 1 | 1 | 1 | 1 | 1 | 0 | 0 | 0 |
| 0 | 1 | 1 | 1 | 1 | 1 | 1 | 1 | 1 | 1 | 0 | 0 |
| 0 | 1 | 1 | 0 | 0 | 0 | 0 | 0 | 0 | 1 | 0 | 0 |
| 0 | 1 | 1 | 0 | 0 | 0 | 0 | 0 | 0 | 1 | 1 | 0 |
| 0 | 1 | 1 | 0 | 0 | 0 | 0 | 0 | 0 | 1 | 1 | 0 |
| 0 | 1 | 1 | 0 | 0 | 0 | 0 | 0 | 0 | 1 | 1 | 0 |
| 0 | 1 | 1 | 0 | 0 | 0 | 0 | 0 | 0 | 1 | 1 | 0 |
| 0 | 1 | 1 | 1 | 1 | 1 | 1 | 1 | 1 | 1 | 1 | 0 |
| 0 | 0 | 1 | 1 | 1 | 1 | 1 | 1 | 1 | 1 | 1 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 0 | 1 | 1 | 0 | 0 | 0 | 0 | 0 |
| 0 | 0 | 1 | 1 | 1 | 1 | 1 | 1 | 1 | 1 | 0 | 0 |
| 0 | 1 | 1 | 0 | 0 | 0 | 0 | 0 | 0 | 1 | 0 | 0 |
| 0 | 1 | 1 | 0 | 0 | 0 | 0 | 0 | 0 | 1 | 0 | 0 |
| 0 | 0 | 1 | 0 | 0 | 0 | 0 | 0 | 0 | 1 | 0 | 0 |
| 0 | 1 | 1 | 0 | 0 | 0 | 0 | 0 | 0 | 1 | 0 | 0 |
| 0 | 0 | 1 | 0 | 0 | 0 | 0 | 0 | 0 | 1 | 1 | 0 |
| 0 | 0 | 1 | 1 | 1 | 1 | 1 | 1 | 1 | 1 | 0 | 0 |
| 0 | 0 | 0 | 0 | 1 | 1 | 0 | 1 | 1 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

SYSTEMS AND METHODS FOR IMPROVED LINE EDGE QUALITY

BACKGROUND

1. Field

This invention is directed to systems and methods for an image processing system that improve the quality of line edges for rendering.

2. Description of Related Art

Scanners and other types of image capture devices, and digital copiers and other image forming devices, have become ubiquitous office productivity tools for generating electronic images of physical original documents or generating physical copies of electronic images. Once an electronic image has been generated, either from scratch or from a physical original document, the electronic image data can be used in an infinite variety of ways to increase the productivity and the product quality of an office. Image capture devices include desktop scanners, other stand alone scanners, digital still cameras, digital video cameras, the scanning input portions of digital copiers, facsimile machines and other devices that are capable of generating electronic image data from an original document, and the like. These image capture devices can also include image databases that store previously captured electronic image data. Image forming devices may include digital copiers, laser printers, ink jet printers, color ink jet printers, and the like.

As the costs of these various image capture devices and image forming device have dropped and the output quality of the physical copies and the captured electronic image data has improved, these image capture devices and image forming devices have been provided with an ever increasing number of controllable features. Similarly, as users have become comfortable with capturing and using electronic image data obtained from original documents to create physical copies, the uses to which the electronic image data has been put, and thus the needed control over the quality and appearance of the electronic image data and the physical copies, have expanded greatly.

In order to achieve high quality from a scanned image when rendering the image for printing on a device, such as, for example, a color xerographic printer, rendering tags or identifiers that direct the use of different rendering modes, for example, different screen frequencies, may be utilized to optimally reproduce the various features in the image. Since there is no accepted standard for what tags to use, image processing electronics must be resident in the output device or printer to examine the image and generate a useful set of rendering tags to be used when printing the image. Another approach is to use an encoding known as Multiple Raster Content (MRC) wherein different parts of the scanned image are stored as separate objects or layers with different representations, for example, binary for text and line art and contone for image data. In order to achieve high quality at the printer for text and line art, it is desirable to encode the text and line art at high resolution, for example, even at a resolution higher than that of the printer. ITU-T Recommendation T.44 document, published by the Telecommunication Standardization Sector of the International Telecommunication Union, for example, illustrates Mixed Raster Content.

SUMMARY

Various image processing and/or rendering devices may have varying resolution requirements and/or capabilities. Therefore, it would be desirable to be able to transform image data from a higher resolution to a lower resolution, for example, while maintaining image quality for rendering of an image from the image data. For example, it may be desirable to transform image data at a 1200×1200 resolution into image data at a 600×600 resolution.

An approach is to use a multiple mask MRC (multiple raster content) file from which rendering tags may be generated at the receiving end. For example, edge tags may be used to improve the rendering of text and/or line art. By identifying pixels as corresponding to edges of image data, such pixels may be rendered with good quality, for example, using a high dot per line inch screen. For example, a 600 lpi line screen may be used for edge pixels of neutral text and lines, while a 300 lpi line screen may be used for edges of color text and lines, and a 200 lpi line screen may be used for all other pixels of the image data.

A method for improving image quality of image data to be rendered may comprise processing a first binary bit map of image data to generate a processed binary bit map, assigning an edge tag to at least one pixel in the processed binary bit map, and assigning a non-binary, for example, a value between 0 and 255 for an eight bit representation, gray/color value to at least one pixel in the processed binary bit map based on values of corresponding pixels in the first binary bit map.

Processing a first binary bit map of image data to generate a processed binary bit map may comprise processing the first binary bit map of image data to obtain a second binary bit map that identifies edge pixels of the image data, and generating a third binary bit map from the first and second binary bit maps.

Assigning an edge tag to at least one pixel in the processed binary bit map may comprise assigning an edge tag to at least one pixel in the third binary bit map based on a value of at least one corresponding pixel in the first binary bit map.

Assigning a gray/color value to at least one pixel in the processed binary bit map based on values of corresponding pixels in the first binary bit map may comprise assigning a gray/color value to each pixel assigned an edge tag in the third binary bit map based on values of corresponding pixels in the first binary bit map.

Processing the first binary bit map may comprise analyzing a value of a pixel and values of a plurality of other pixels in the first binary bit map, and changing a value of the pixel based on the value of the pixel and the values of the plurality of other pixels. Changing the value of the pixel based on the value of the pixel and the values of the plurality of other pixels may comprise changing the value of the pixel from one to zero when at least one value of the plurality of other pixels is zero.

In such cases, the method may further comprise leaving the value of the pixel unchanged when the value of the pixel is zero, and leaving the value of the pixel unchanged when the value of the pixel is one and the value of each of the plurality of other pixels is one.

The plurality of other pixels may be adjacent the pixel and/or may include at least one pixel that is not adjacent to the pixel. Further, the pixel and the plurality of other pixels may form a square, a cross or an x.

Assigning a gray/color value to each pixel assigned an edge tag may comprise assigning a gray/color value that is proportional to the values of corresponding pixels in the first binary bit map.

Processing a first binary bit map of image data to generate a processed binary bit map may also comprise processing the first binary bit map to obtain a second binary bit map, a third binary bit map, a fourth binary bit map and a fifth binary bit map, and processing the second, third, fourth and fifth binary bit maps to obtain a sixth binary bit map.

Processing the first binary bit map to obtain the second, third, fourth and fifth binary bit maps may comprise shifting the first binary bit map to obtain first, second, third and fourth shifted binary bit maps, exclusively ORing the first shifted binary bit map with the first binary bit map to obtain the second binary bit map, exclusively ORing the second shifted binary bit map with the first binary bit map to obtain the third binary bit map, exclusively ORing the third shifted binary bit map with the first binary bit map to obtain the fourth binary bit map, and exclusively ORing the fourth shifted binary bit map with the first binary bit map to obtain the fifth binary bit map.

In such cases, shifting the first binary bit map to obtain the first, second, third and fourth shifted binary bit maps may comprise shifting the first binary bit map up one pixel and left one pixel to obtain the first shifted binary bit map, shifting the first binary bit map up one pixel and right one pixel to obtain the second shifted binary bit map, shifting the first binary bit map down one pixel and left one pixel to obtain the third shifted binary bit map, and shifting the first binary bit map down one pixel and right one pixel to obtain the fourth shifted binary bit map.

Processing the second, third, fourth and fifth binary bit maps to obtain the sixth binary bit map may comprise ORing the second, third, fourth and fifth binary bit maps.

Assigning an edge tag may comprise assigning a candidate edge tag to at least one pixel in the sixth binary bit map based on a value of at least one corresponding pixel in the first binary bit map, and determining a final edge tag bit map based on the assignment of candidate edge tags.

In such cases, assigning a gray/color value may comprise assigning a gray/color value to each pixel assigned a candidate edge tag in the sixth binary bit map based on values of corresponding pixels in the first binary bit map.

Further, determining a final edge tag bit map may comprise a step of identifying one or more pixels that have been determined to be an edge pixel and have a zero value in the image that will be rendered using the edge tags, and a step of reclassifying such one or more pixels as not being an edge pixel. In such a manner, surrounding pixels in the entire, assembled image may not have a false edge tag associated therewith.

A computer readable medium may be provided that includes instructions readable by a computer. The instructions may comprise instructions for processing a first binary bit map of image data to generate a processed binary bit map, instructions for assigning an edge tag to at least one pixel in the processed binary bit map, and instructions for assigning a gray/color value to at least one pixel in the processed binary bit map based on values of corresponding pixels in the first binary bit map.

A system for improving image quality of image data to be rendered may comprise: an image data source that provides image data of an original image; a processor that processes a first binary bit map of the image data provided by the image data source to generate a processed binary bit map, assigns an edge tag to at least one pixel in the processed binary bit map, and assigns a gray/color value to at least one pixel in the processed binary bit map based on values of corresponding pixels in the first binary bit map; and an image rendering device that provides a rendered image of the original image based on the at least one assigned edge tag and the at least one assigned gray/color value.

These and other features are described in or are apparent from the following detailed description.

BRIEF DESCRIPTION OF THE DRAWINGS

Various details are described below, with reference to the following figures, wherein:

FIG. 1 is an exemplary binary bit map of image data;

FIG. 2 is an exemplary binary bit map obtained by processing the binary bit map of FIG. 1;

FIG. 3 is an exemplary binary bit map obtained by subtracting the binary bit map of FIG. 2 from the binary bit map of FIG. 1;

FIG. 6 is another exemplary binary bit map of image data, corresponding to a fine line feature;

FIG. 7 is an exemplary binary bit map obtained by processing the binary bit map of FIG. 6;

FIG. 8 is an exemplary binary bit map obtained by subtracting the binary bit map of FIG. 7 from the binary bit map of FIG. 6;

FIG. 9 is an exemplary edge tag bit map generated from the binary bit map of FIG. 8;

FIG. 10 is a gray value bit map generated from the binary bit map of FIG. 6;

FIG. 12 is another exemplary binary bit map of image data;

FIG. 13 is an exemplary second binary bit map generated by processing the binary bit map of FIG. 12;

FIG. 14 is an exemplary third binary bit map generated by processing the binary bit map of FIG. 12;

FIG. 15 is an exemplary fourth binary bit map generated by processing the binary bit map of FIG. 12;

FIG. 16 is an exemplary fifth binary bit map generated by processing the binary bit map of FIG. 12;

FIG. 17 is an exemplary sixth binary bit map generated by processing the second, third, fourth and fifth binary bit maps;

DETAILED DESCRIPTION OF EXEMPLARY EMBODIMENTS

Figure 4:
FIG. 4 is an exemplary edge tag bit map generated from the binary bit map of FIG. 3.

The following detailed description provides various details with respect to a 1200×1200 resolution binary bit map of image data. Further, various details are provided with respect to black and white image data, i.e., image data having gray values. However, it will be understood that various aspects of the invention may be applied to other resolutions and/or color image data, as desired. Thus, the following description is intended to be illustrative and not limiting.

In the exemplary implementations described herein, image data is transformed from a higher resolution to a lower resolution, for example, while maintaining image quality for rendering of an image from the image data. In particular, implementations are described in which image data at a 1200×1200 resolution is transformed into image data at a 600×600 resolution.

A multiple binary mask MRC file may be provided with a higher quality, for example, for text and/or line art. For example, a 1200×1200 binary mask in a multiple binary mask MRC file may be used to generate both edge rendering tags and gray edge values. Such an approach may enable the production of higher quality output by a rendering device. For example, edge tags may be used to render text and/or line art. By identifying pixels as corresponding to edges of image data, such pixels may be rendered with good quality, for example, using a high dot per line inch screen.

A method for improving image quality of image data to be rendered may comprise processing a first binary bit map of image data to generate a processed binary bit map. An edge tag may be assigned to one or more pixels in the processed binary bit map. Further, a gray/color value may be assigned to such pixel(s) in the processed binary bit map based on values of corresponding pixels in the first binary bit map. The following description provides further details for implementing such a method.

Figure 1:
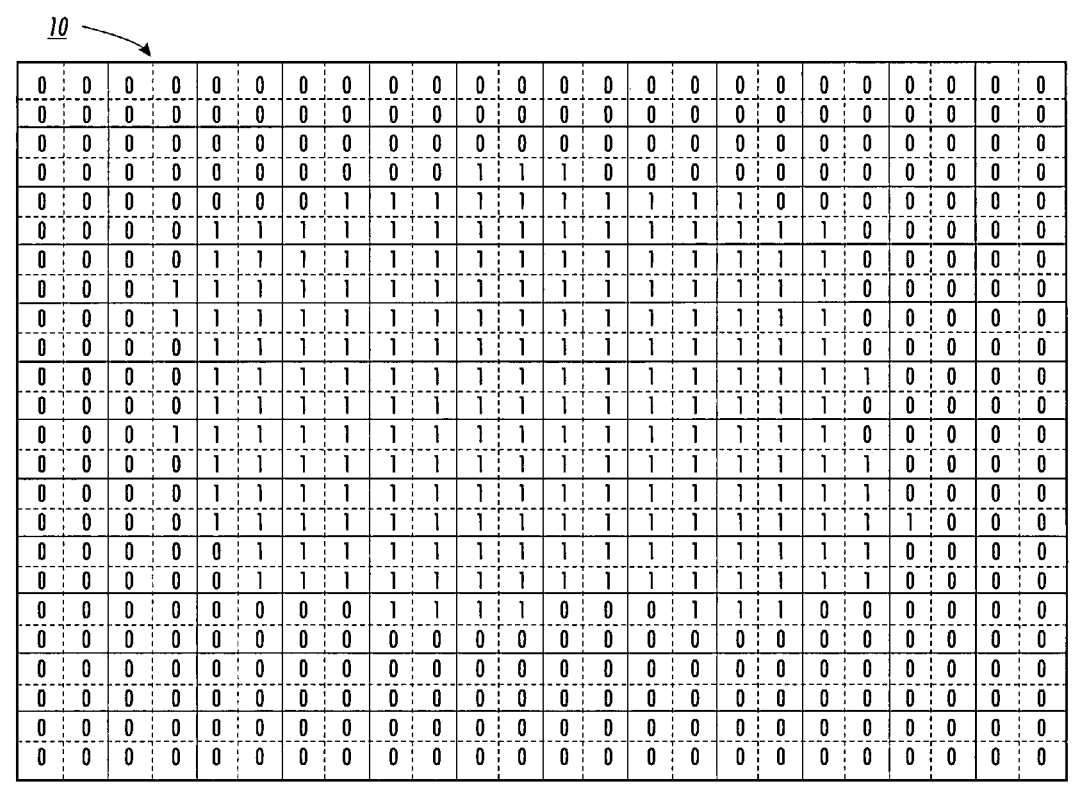

FIG. 1 illustrates an exemplary 1200×1200 binary bit map 10 of image data, which may be of any type. Each of the small rectangles, indicated by dashed lines, represents a single 1200×1200 pixel. A one in the binary bit map 10 indicates that image data is present at that pixel. A zero in the binary bit map 10 indicates that image data is not present at that pixel. Each of the larger rectangles, indicated by solid lines, represents a single 600×600 pixel in a 600×600 binary bit map to be generated.

The original binary bit map 10 is processed in order to identify edge pixels. For example, a structuring element may be used to process each individual pixel by analyzing a value of a pixel and values of a plurality of other pixels in the first binary bit map, and changing a value of the pixel based on the value of the pixel and the values of the plurality of other pixels. For example, a structuring element in the shape of a square at 1200×1200 resolution having nine elements each assigned a value of one may be selected. Other shapes and/or sizes for the structuring element may be selected, such as, for example, a larger square, a cross, an x, or the like.

The structuring element may be placed with its center pixel located at each pixel in turn in the original binary bit map 10 to process each pixel. For example, if the pixel being processed has a zero value, the value of the pixel being processed may remain unchanged. If the pixel being processed has a one value and the pixels at the other locations (eight) covered by the structuring element also have a one value, the value of the pixel being processed may also remain unchanged. If the pixel being processed has a one value and any of the pixels at the other locations (eight) covered by the structuring element have a zero value, the value of the pixel being processed may be changed to zero.

Thus, changing the value of a pixel being processed may comprise changing the value of the pixel from one to zero when at least one value of the plurality of other pixels is zero. Further, the value of the pixel may remain unchanged when the value of the pixel is zero, and when the value of the pixel is one and the value of each of the plurality of other pixels is one.

When each of the pixels in the original binary bit map 10 are processed by a structuring element as described above, a processed binary bit map 20 is obtained, as shown in FIG. 2.

The processed binary bit map 20 may then be subtracted from the original binary bit map 10. This yields a third binary bit map 30, as shown in FIG. 3.

Next, an edge tag bit map 40, shown in FIG. 4, may be generated from the third binary bit map 30 of FIG. 3. For example, an edge tag value of one may be assigned to any of the 600×600 pixels that have a value of one in any of the corresponding four 1200×1200 pixels in the original binary bit map 10. As shown in FIG. 4, a value of 1 in a 600×600 pixel indicates an edge pixel and a value of zero in a 600×600 pixel indicates a non-edge pixel. Edge tags may thus be assigned to pixels based on the edge tag bit map 40, for example, for purposes of rendering the original image data.

Figure 5:
FIG. 5 is a gray value bit map generated from the binary bit map of FIG. 1.

Next, a gray value bit map 50, as shown in FIG. 5, may be generated from the original binary bit map 10. For example, a 600×600 resolution gray image may be generated from the 1200×1200 resolution binary image. This may be achieved, for example, by assigning gray values to 600×600 pixels based on the values of the corresponding four 1200×1200 pixels in the original binary bit map 10. For example, if all four of the 1200×1200 pixels corresponding to a 600×600 pixel have zero values, then a value of the 600×600 pixel may be set to zero. If one of the 1200×1200 pixels corresponding to a 600×600 pixel has a one value, then a value of the 600×600 pixel may be set to sixty-four. If two of the 1200×1200 pixels corresponding to a 600×600 pixel have one values, then a value of the 600×600 pixel may be set to 128. If three of the 1200×1200 pixels corresponding to a 600×600 pixel have one values, then a value of the 600×600 pixel may be set to 192. If all of the 1200×1200 pixels corresponding to a 600×600 pixel have one values, then a value of the 600×600 pixel may be set to 255.

The foregoing values assigned to the 600×600 pixels are based on rendering a black mask. However, the foregoing may be implemented for a gray mask and/or a color mask. Identification of the edge pixels may remain the same, for example, as described above, but the values assigned to the pixels for rendering may be changed. For example, if the value of a gray line image is 180, then the corresponding values to be assigned to the edge pixels would be zero, forty-five, ninety, 135 and 180. Further, gray values other than zero, twenty-five, fifty, seventy-five and one hundred percent of the full value may be used.

For color masks, it may be desirable to keep the hue of the edges equal to the hue of the color assigned to the mask. For example, the color assigned to the mask may be converted to a luminance-chrominance color space, L*a*b*. L* values for the edge pixels may then be generated, for example, using a formula analogous to that used for gray edge pixels where black is the color assigned to the mask, and assigned to edge pixels for the case. For example, the assigned values may be: 255; 75% of (255−L*)+L*; 50% of (255−L*)+L*; 25% of (255−L*)+L*; and, L*, where L* ranges from 0 to 255 in an 8-bit per pixel representation. The percentages may be modified to optimize the performance for any given printing engine. Once an L* value is assigned to the edge pixels, if desired, a transformation to an intermediate color space may be carried out, or the L*a*b* values of all the pixels may be converted directly to the device color space, such as CMYK values that will be printed. While L*a*b* is mentioned above, it should be understood that the algorithm is not limited to the use of that particular color space. Further, while it may be advantageous to generate the values to be assigned to the edge pixels in a luminance-chrominance color space, the algorithm may be used without doing so.

An advantage of the foregoing processing is that it not only finds/identifies edge pixels where the value of the 600×600 pixel to be rendered is less than 255, but also finds/identifies edge pixels where the value of the 600×600 pixel to be rendered is 255. Further, such processing may be used for obtaining high image quality of line art, as described below with respect to FIGS. 6-10.

FIG. 6 is an exemplary binary bit map 60 of image data corresponding to a fine line feature. The original binary bit map 60 is processed in order to identify edge pixels. As described above, for example, a structuring element may be used to process each individual pixel by analyzing a value of a pixel and values of a plurality of other pixels in the first binary bit map, and changing a value of the pixel based on the value of the pixel and the values of the plurality of other pixels.

Using a structuring element in the shape of a square at 1200×1200 resolution having nine elements each assigned a value of one, for example, each pixel in the original binary bit map 60 may be processed in turn. Thus, a processed binary bit map 70 may be obtained, as shown in FIG. 7.

The processed binary bit map 70 may then be subtracted from the original binary bit map 60. This yields a third binary bit map 80, as shown in FIG. 8.

Next, an edge tag bit map 90, shown in FIG. 9, may be generated from the third binary bit map 80 of FIG. 8. As described above, an edge tag value of one may be assigned to any of the 600×600 pixels that have a value of one in any of the corresponding four 1200×1200 pixels in the original binary bit map 60. As shown in FIG. 9, a value of 1 in a 600×600 pixel indicates an edge pixel and a value of zero in a 600×600 pixel indicates a non-edge pixel.

Next, a gray value bit map 100, as shown in FIG. 10, may be generated from the original binary bit map 60. As described above, a 600×600 resolution gray image may be generated from the 1200×1200 resolution binary image.

Figure 11:
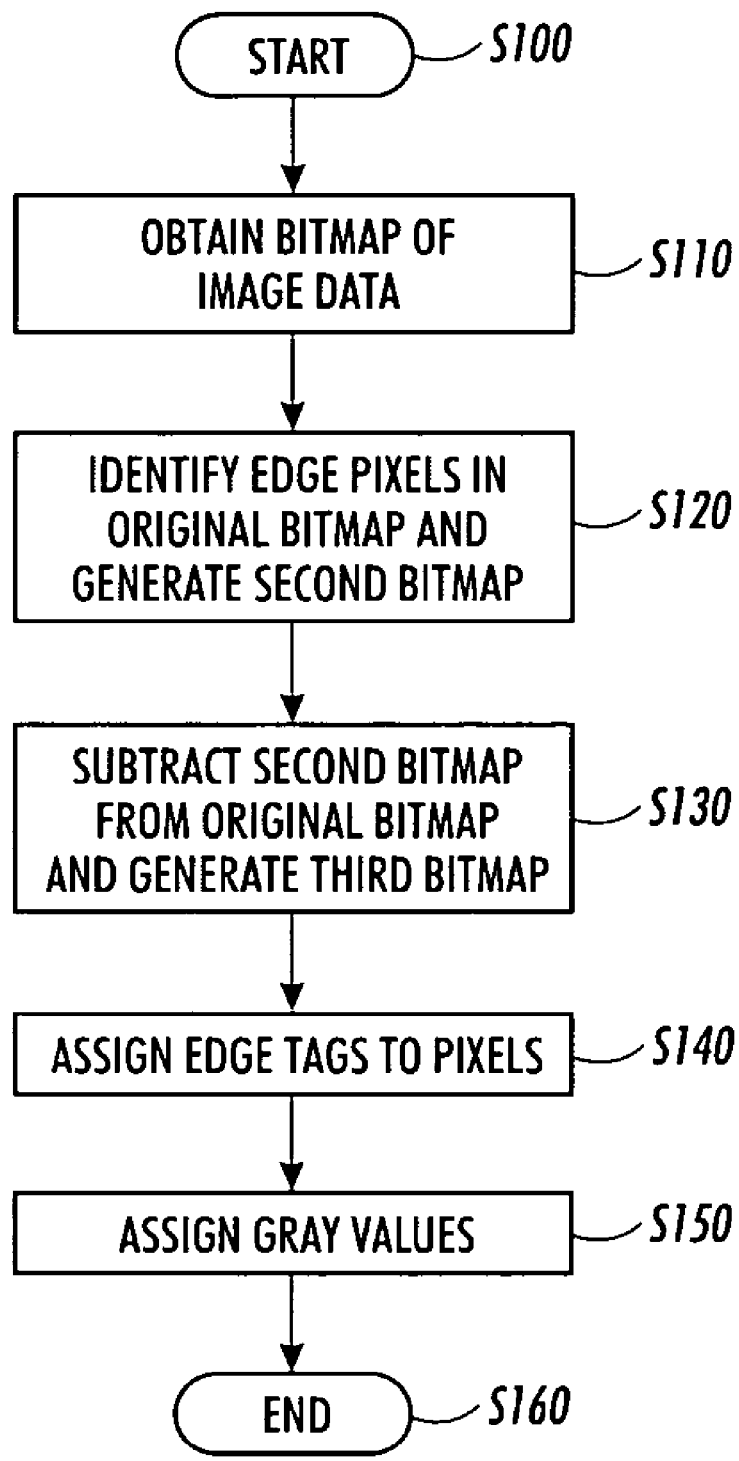
FIG. 11 is a flowchart outlining an exemplary method for generating edge rendering tags and gray edge values.

FIG. 11 is a flowchart outlining an exemplary method for generating edge rendering tags and gray edge values. The method starts in step S100 and continues to step S110, where a bit map of image data is obtained. The bit map may be obtained from any known or hereafter developed method or device, such as by optical capture using, for example, a scanner.

The image data captured by the scanner may be processed to determine which parts of the captured data may be best represented in the form of a binary bit map to which is assigned the color of the group of pixels. For example, if there is a paragraph of "red" text, the processing algorithm may identify that the paragraph is an object to which the constant color "red" may be assigned. By capturing this information in a binary bit map at a high enough sampling, for example 1200×1200, the edges may be preserved and the object may be encoded in a relatively small number of pixels. Various means may be employed for segmenting the image into parts that may be represented as a binary bit map to which a color is assigned The bit map of image data, or original bit map, obtained in step S110 is processed in step S120 in order to identify edge pixels in the original bit map. For example, as described above, a structuring element may be used to individually process each pixel in the original bit map based on the value of the pixel and the values of a plurality of other pixels. The plurality of other pixels may be adjacent to the pixel. However, pixels that are not adjacent to the pixel being processed are not necessarily excluded. In step S120, the processing of each pixel in the original bit map generates a second (processed) bit map.

The processed bit map is then subtracted from the original bit map in step S130, resulting in a third bit map. The third bit map may be used, in step S140, to generate an edge tag bit map by assigning edge tags to pixels in the third bit map. The values of the pixels in the original bit map may be evaluated to determine which pixels in the edge tag bit map should be identified as edge tags, i.e., assigned a value of one. For example, as described above, where the original bit map is a 1200×1200 resolution bit map, a value of one may be assigned to each pixel in a 600×600 resolution edge tag bit map when any of the corresponding pixels in the original bit map has a value of one. All other pixels in the edge tag bit map are assigned a value of zero. The resulting edge tag bit map thus indicates each pixel as being an edge pixel or a non-edge pixel.

Next, in step S150, gray values may be assigned to each pixel in a bit map based on the values of corresponding pixels in the original bit map. For example, as described above, four pixels in a 1200×1200 resolution original bit map may be examined to determine a gray value to assign a corresponding pixel in a 600×600 resolution gray value bit map. Once the edge tag bit map and the gray value bit map are generated, the process may proceed to step S160, where the process ends.

Figure 12:
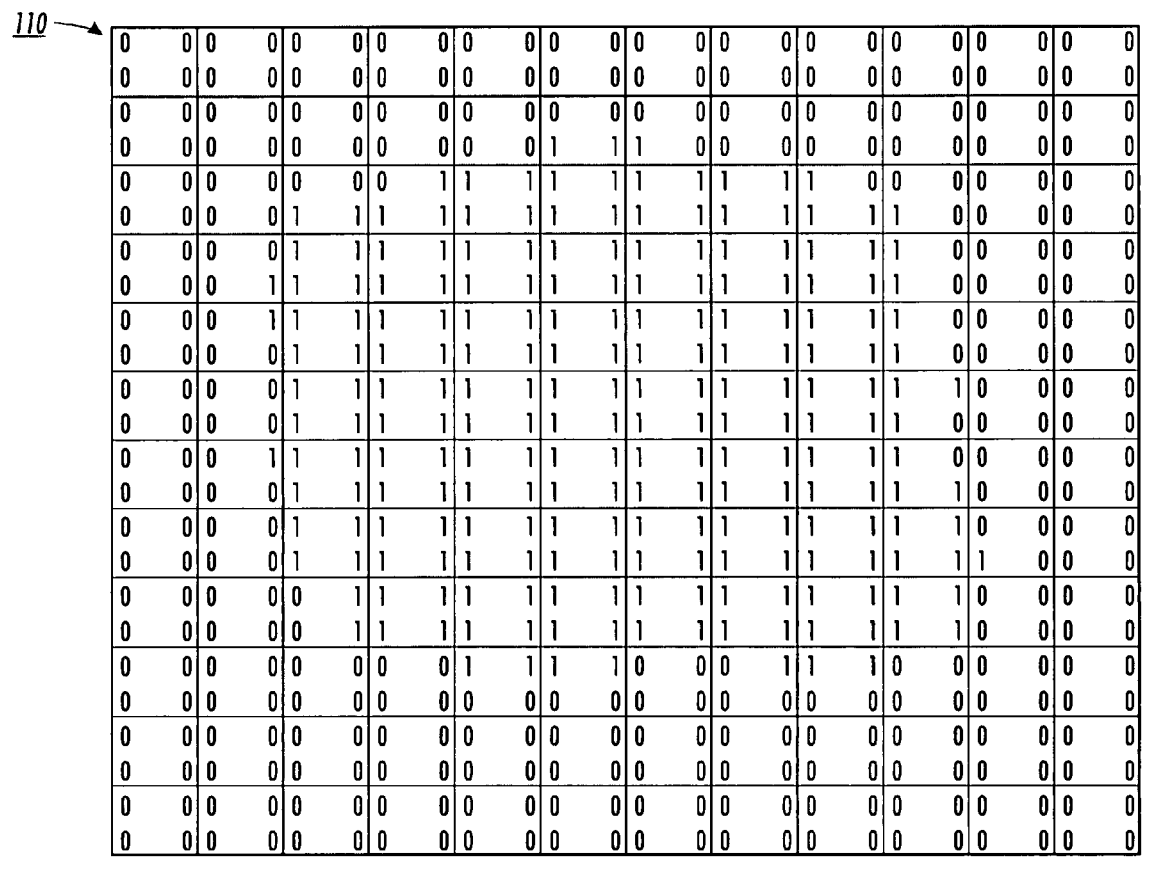

Another approach to finding edge pixels is described with respect to FIGS. 12-21. FIG. 12 illustrates an exemplary 1200×1200 binary bit map 110 of image data. For example, the binary bit map 110 may be of image data that has been determined to be most efficiently represented by a binary bit map to which a color is assigned. Each of the small rectangles, indicated by dashed lines, represents a single 1200×1200 pixel. A one in the binary bit map 110 indicates that image data is present at that pixel. A zero in the binary bit map 110 indicates that image data is not present at that pixel. Each of the larger rectangles, indicated by solid lines, represents a single 600×600 pixel in a 600×600 binary bit map to be generated.

The original binary bit map 110 is processed in order to identify edge pixels. In this case, for example, second, third, fourth and fifth binary bit maps are generated by processing the original binary bit map 110. Processing the first binary bit map to obtain the second, third, fourth and fifth binary bit maps may comprise shifting the first binary bit map to obtain first, second, third and fourth shifted binary bit maps, exclusively ORing the first shifted binary bit map with the first binary bit map to obtain the second binary bit map, exclusively ORing the second shifted binary bit map with the first binary bit map to obtain the third binary bit map, exclusively ORing the third shifted binary bit map with the first binary bit map to obtain the fourth binary bit map, and exclusively ORing the fourth shifted binary bit map with the first binary bit map to obtain the fifth binary bit map.

For example, the original binary bit map 110 may be shifted one pixel up and left to obtain a first shifted binary bit map (not shown). The first shifted binary bit map may be exclusively ORed with the original binary bit map 110 to obtain a second binary bit map 120, as shown in FIG. 13.

The original binary bit map 110 may be shifted one pixel up and right to obtain a second shifted binary bit map (not shown). The second shifted binary bit map may be exclusively ORed with the original binary bit map 110 to obtain a third binary bit map 130, as shown in FIG. 14.

Figure 15:
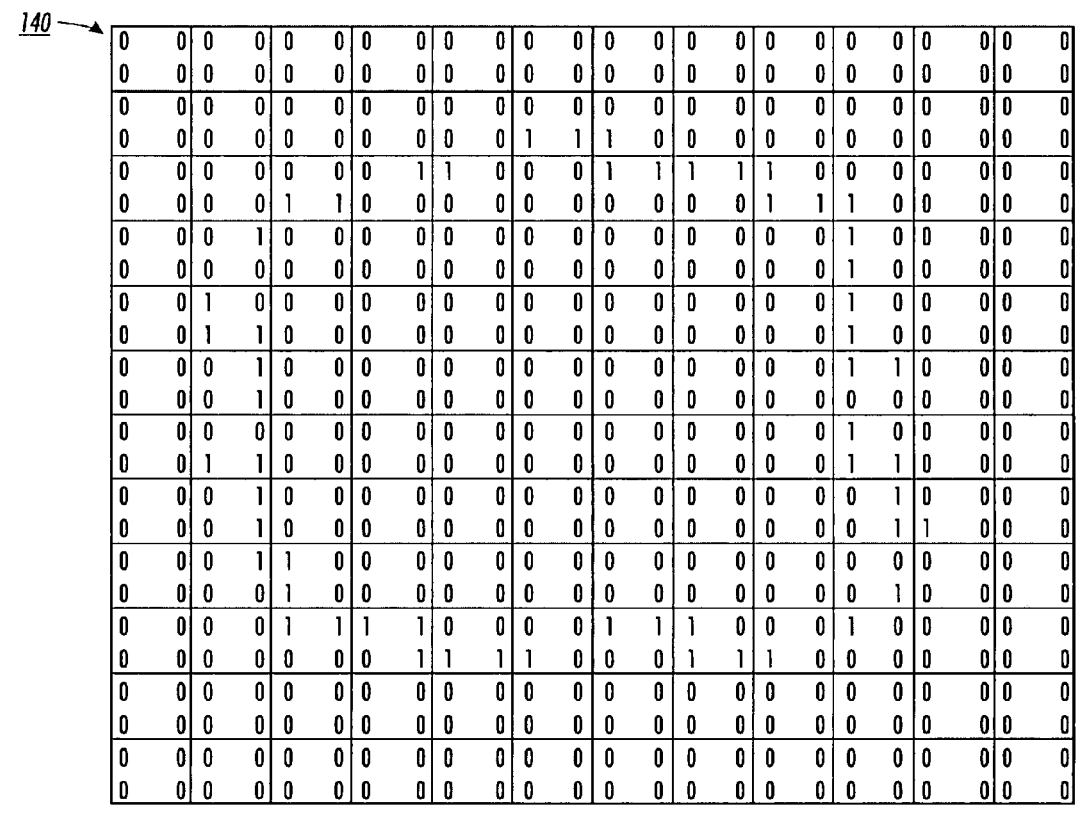

The original binary bit map 110 may be shifted one pixel down and left to obtain a third shifted binary bit map (not shown). The third shifted binary bit map may be exclusively ORed with the original binary bit map 110 to obtain a fourth binary bit map 140, as shown in FIG. 15.

The original binary bit map 110 may be shifted one pixel down and right to obtain a fourth shifted binary bit map (not shown). The fourth shifted binary bit map may be exclusively ORed with the original binary bit map 110 to obtain a fifth binary bit map 150, as shown in FIG. 16.

The four shifts described above are only for illustration purposes. Other sets of shifts may be used, for example, and more than four specified shifts may be used, as desired.

The second, third, fourth and fifth binary bit maps 120, 130, 140 and 150 are then further processed to obtain a sixth bit map. For example, the second, third, fourth and fifth binary bit maps 120, 130, 140 and 150 may be ORed to obtain a sixth bit map 160, as shown in FIG. 17. As shown in this illustrative example, processing the 1200×1200 resolution original bit map 110 results in the 600×600 resolution bit map 160.

Figure 18:
FIG. 18 is an exemplary candidate edge tag bit map generated from the sixth binary bit map.

A candidate edge tag bit map 170, as shown in FIG. 18, may be generated from the sixth binary bit map 160 of FIG. 17. For example, an edge tag value of one may be assigned to any of the 600×600 pixels that have a value of one in any of the corresponding four 1200×1200 pixels in the original binary bit map 110. As shown in FIG. 18, a value of 1 in a 600×600 pixel indicates a candidate edge pixel and a value of zero in a 600×600 pixel indicates a non-candidate edge pixel.

Figure 19:
FIG. 19 is an exemplary gray value bit map generated from the binary bit map of FIG. 12.

Next, a gray value bit map 180, as shown in FIG. 19, may be generated from the original binary bit map 110. For example, a 600×600 resolution gray image may be generated from the 1200×1200 resolution binary image. This may be achieved, for example, by assigning gray values to 600×600 pixels based on the values of the corresponding four 1200× 1200 pixels in the original binary bit map 110. For example, if all four of the 1200×1200 pixels corresponding to a 600× 600 pixel have zero values, then a value of the 600×600 pixel may be set to zero. If one of the 1200×1200 pixels corresponding to a 600×600 pixel has a one value, then a value of the 600×600 pixel may be set to sixty-four. If two of the 1200×1200 pixels corresponding to a 600×600 pixel have one values, then a value of the 600×600 pixel may be set to 128. If three of the 1200×1200 pixels corresponding to a 600×600 pixel have one values, then a value of the 600×600 pixel may be set to 192. If all of the 1200×1200 pixels corresponding to a 600×600 pixel have one values, then a value of the 600×600 pixel may be set to 255.

The foregoing values assigned to the 600×600 pixels are based on rendering a black mask. However, the foregoing may be implemented for a gray mask and/or a color mask. Identification of the edge pixels may remain the same, for example, as described above, but the values assigned to the pixels for rendering may be changed. For example, if the value of a gray line image is 180, then the corresponding values to be assigned to the edge pixels would be zero, forth-five, ninety, 135 and 180. Further, gray values other than zero, twenty-five, fifty, seventy-five and one hundred percent of the full value may be used.

Figure 20:
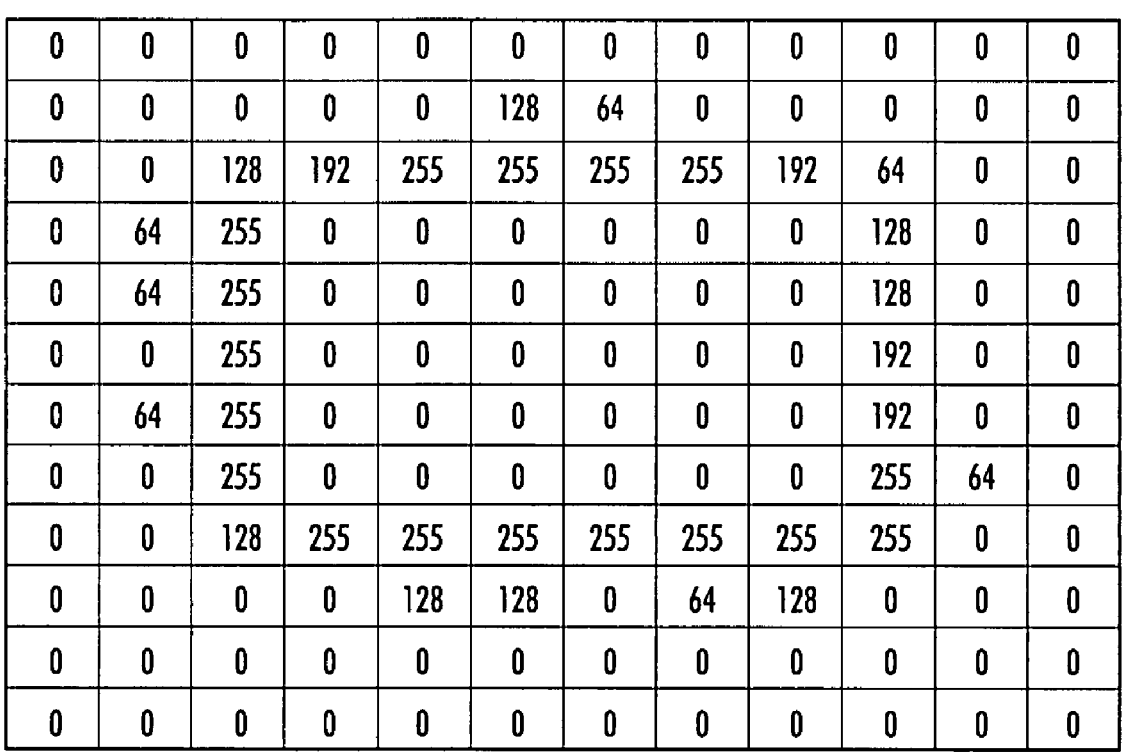
FIG. 20 is an exemplary 8-bpp (bits per pixel) bit map generated by processing the candidate edge tag bit map and the gray value bit map.

Next, a final edge tag bit map is to be determined. The zero and one values representing non-candidate edge tag pixels and candidate edge tag pixels in the candidate edge tag bit map 170 shown in FIG. 18 may be converted into an 8-bpp bit map, for example, by converting to zeroes and 255 s. The resulting 8-bpp bit map may then be ANDed with the gray value bit map 180 shown in FIG. 19. This results in an intermediate bit map 190, as shown in FIG. 20.

Figure 21:
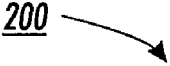
FIG. 21 is an exemplary final edge tag bit map generated from the "8-bpp bit map"

A threshold operation may be applied to the intermediate bit map 190, for example, with a threshold value of one, to generate a final edge tag bit map 200, as shown in FIG. 21. The threshold operation thus converts all zero value pixels in the intermediate bit map 190 to zero value pixels in the final edge tag bit map 200 and converts all non-zero value pixels in the intermediate bit map 190 to one value pixels in the final edge tag bit map 200. As shown in FIG. 21, a value of 1 in a 600×600 pixel indicates an edge pixel and a value of zero in a 600×600 pixel indicates a non-edge pixel. Edge tags may thus be assigned to pixels based on the final edge tag bit map 200, for example, for purposes of rendering the original image data.

An advantage of the foregoing processing is that it not only finds/identifies edge pixels where the value of the 600×600 pixel to be rendered is less than 255, but also finds/identifies edge pixels where the value of the 600×600 pixel to be rendered is 255.

Figure 22:
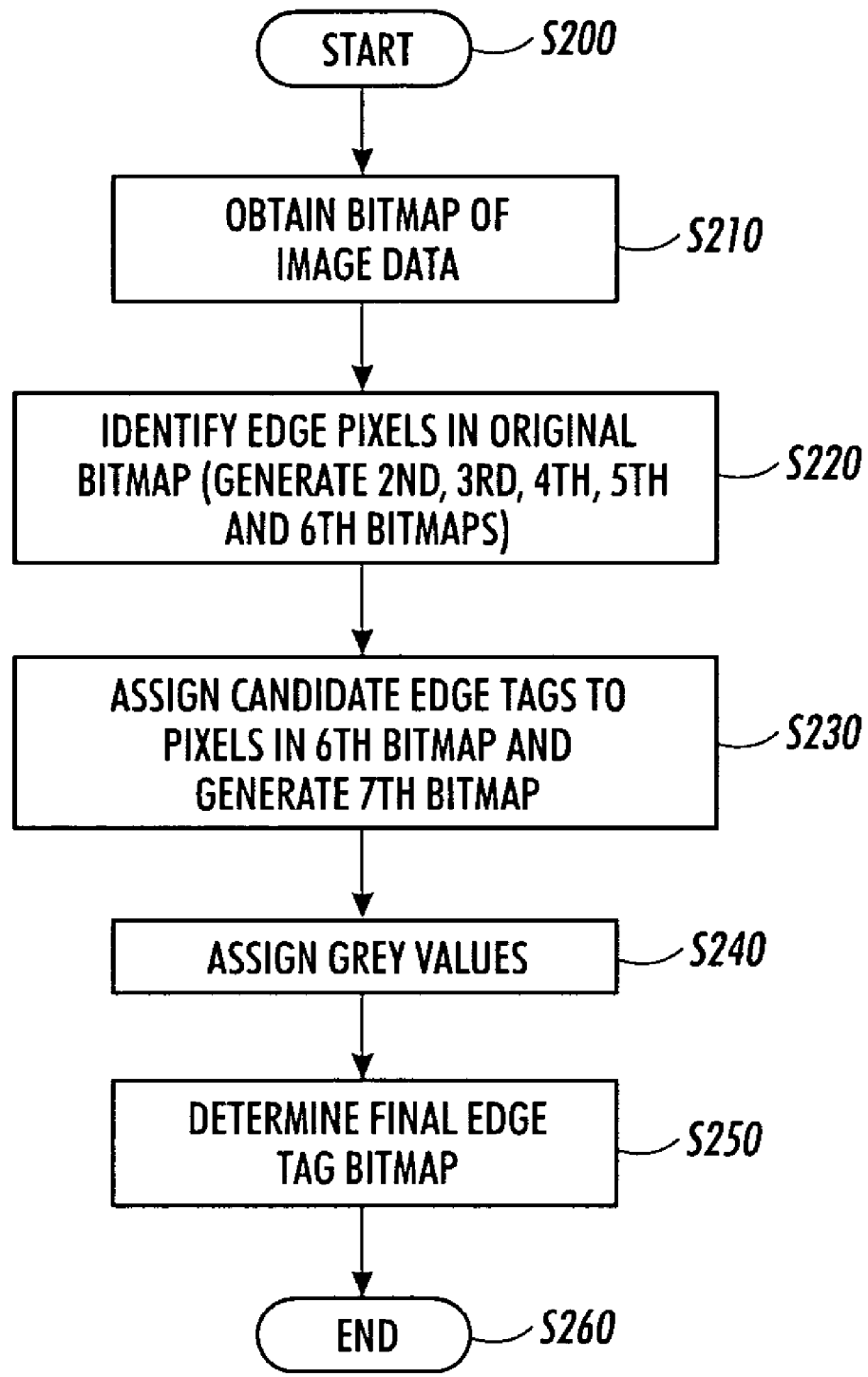
FIG. 22 is a flowchart outlining another exemplary method for generating edge rendering tags and gray edge values.

FIG. 22 is a flowchart outlining another exemplary method for generating edge rendering tags and gray edge values. The method starts in step S200 and continues to step S210, where a bit map of image data is obtained. As discussed above, the bit map may be obtained from any known or hereafter developed method or device.

The bit map of image data, or original bit map, obtained in step S210 is processed in step S220 in order to identify edge pixels in the original bit map. For example, as described above, second, third, fourth and fifth bit maps may be generated by processing the original bit map. Processing the original bit map to obtain the second, third, fourth and fifth bit maps may comprise shifting the original bit map to obtain first, second, third and fourth shifted bit maps, exclusively ORing the first shifted bit map with the original bit map to obtain the second bit map, exclusively ORing the second shifted bit map with the original bit map to obtain the third bit map, exclusively ORing the third shifted bit map with the original bit map to obtain the fourth bit map, and exclusively ORing the fourth shifted bit map with the original bit map to obtain the fifth bit map. As described above, other sets of shifts may be used.

The second, third, fourth and fifth binary bit maps are then further processed to obtain a sixth bit map. Thus, in step S220, the processing of each pixel in the original bit map generates a sixth (processed) bit map.

Figure 23:
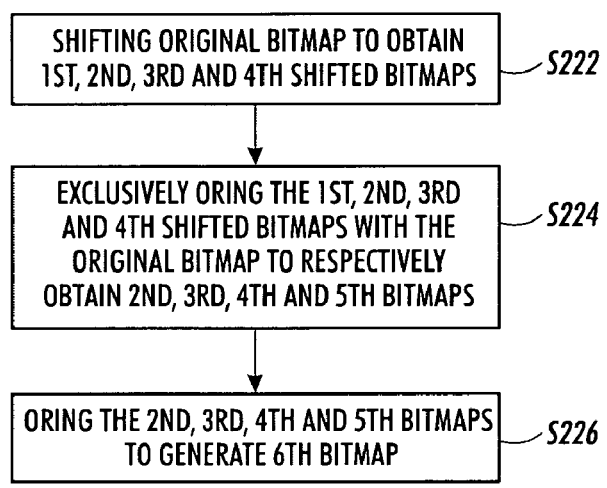
FIG. 23 illustrates further exemplary details of a portion of the flowchart of FIG. 22.

Additional details of step S220 are illustrated in the exemplary sub-flowchart shown in FIG. 23. For example, the shifting of the original bit map may be carried out in sep S222. Then, in step S224, the shifter bit maps may be exclusively ORed with the original bit map. Finally, in step S226, the bit maps obtained in step S224 may be ORed to generate the sixth bit map.

Returning to FIG. 22, in step S230, a candidate edge tag bit map may be generated from the sixth binary bit map. For example, as described above, an edge tag value of one may be assigned to any of the 600×600 pixels that have a value of one in any of the corresponding four 1200×1200 pixels in the original binary bit map 110. A value of 1 in a 600×600 pixel indicates a candidate edge pixel and a value of zero in a 600×600 pixel indicates a non-candidate edge pixel.

Next, in step S240, gray values may be assigned to each pixel in a bit map based on the values of corresponding pixels in the original bit map. For example, as described above, four pixels in a 1200×1200 resolution original bit map may be examined to determine a gray value to assign a corresponding pixel in a 600×600 resolution gray value bit map. Once the candidate edge tag bit map and the gray value bit map are generated, the process may proceed to step S250.

In step S250, a final edge tag bit map is determined. As described above, for example, the zero and one values representing non-candidate edge tag pixels and candidate edge tag pixels in the candidate edge tag bit map may be converted into an 8-bpp bit map, for example, by converting to zeroes and 255 s. The resulting 8-bpp bit map may then be ANDed with the gray value bit map from step S240. This results in an intermediate bit map 190. A threshold operation may then be applied to the intermediate bit map, for example, with a threshold value of one, to generate a final edge tag bit map. Edge tags may thus be assigned to pixels based on the final edge tag bit map 200, for example, for purposes of rendering the original image data.

Once the final edge tag bit map is determined, the process may proceed to step S260, where the process ends.

A computer readable medium may be provided that includes instructions readable by a computer for carrying out the various details described above. For example, the instructions may comprise instructions for carrying out the various steps of the flowcharts illustrated in FIGS. 11 and 22.

Figure 24:
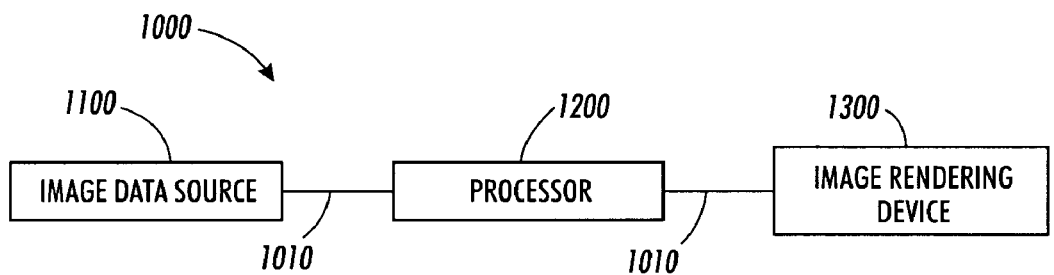
FIG. 24 is a block diagram illustrating an exemplary system for improving image quality of image data to be rendered.

An exemplary system 1000 for improving image quality of image data to be rendered is shown in FIG. 24. The system 1000 may include an image data source 1100 that provides image data of an original image. The image data source 1100 may be any known or hereafter developed device that is capable of supplying image data. For example, the image data source 1100 may be a storage device, such as a hard drive, diskette, memory or the like, or may be a larger device or sub-system that includes a storage device and other components, such as a scanner or the like, for example, capable of providing a binary bit map of the image data.

The image data source 1100 is arranged to provide the binary bit map directly to a processor 1200, or indirectly through another device that uses the raw image data from the image data source 1100 to generate the binary bit map. The processor 1200 processes the binary bit map of the image data from the image data source 1100 to generate a processed binary bit map, assigns an edge tag to at least one pixel in the processed binary bit map, and assigns a gray/color value to at least one pixel in the processed binary bit map based on values of corresponding pixels in the binary bit map from the image data source 1100. For example, the processor 1200 may implement any of the techniques discussed above, for example, to obtain an edge tag bit map and a gray value bit map.

The system 1000 further includes an image rendering device 1300 that provides a rendered image of the original image based on at least one assigned edge tag and at least one assigned gray/color value provided by the processor 1200. For example, the rendering device 1300 may be provided with the edge tag bit map and the gray value bit map from the processor 1200 in order to produce a high quality rendering of the original image. The rendering device 1300 may be any known or hereafter developed device or sub-system that is capable of rendering an image, whether in a tangible medium or an electronic medium, whether visible or not.

The image data source 1100, processor 1200 and the image rendering device 1300, as well as any other various elements, modules and software, may communicate via suitable links 1010, including a direct cable connection, a connection over a wide area network or a local area network, a connection over an intranet, a connection over an extranet, a connection over the Internet, or a connection over any other distributed processing network or system. In general, such a link(s) can be any known or later developed connection system or structure usable to provide communication between the respective elements, modules and software. It should also be appreciated that the link(s) can be wired or wireless links, for example, that use portions of the public switch telephone network and/or portions of a cellular communication network. Further, where only data is communicated between elements, it should be understood that a link may be omitted, for example, in favor of using a portable storage medium to transfer the data.

It should be understood that each of the components of the system 1000 shown in FIG. 24 may be implemented as portions of a suitably programmed general purpose computer. Alternatively, each of the components may be implemented as physically distinct hardware circuits within a ASIC, or using a FPGA, a PLD, a PLA, or a PAL, or using discreet logic elements or discreet circuit elements. The particular form each of the components of the system 1000 will take as a design choice.

Moreover, the system 1000 may be implemented as software executing on a programmed general purpose computer, a special purpose computer, a microprocessor or the like. In this case, the system 1000 may be implemented as routines embedded in a peripheral driver, as a resource residing on a server, or the like.

The image processing system 1000 may also be implemented by physically incorporating it into a software and/or hardware system, such as the hardware and software systems of a digital copier or the like.

While various details have been described above, various alternatives, modifications, variations, improvements, and/or substantial equivalents, whether known or that are or may be presently unforeseen, may become apparent upon reviewing the foregoing disclosure. For example, the techniques for determining edge pixel tags and determining gray values described above apply equally to three-layer MRC files, like those described in the ITU-T Recommendation T.44, for example, where a 1200×1200 dpi selector plane replaces the binary mask and a foreground plane provides shades of neutral or color to be used in generating the gray values. Accordingly, the details and implementations set forth above are intended to be illustrative, not limiting.

What is claimed is:

1. A method for improving image quality of image data to be rendered, comprising:
   processing a first binary bit map of image data to generate a processed binary bit map;
   assigning an edge tag to at least one pixel in the processed binary bit map; and
   assigning a gray/color value to at least one pixel in the processed binary bit map based on values of corresponding pixels in the first binary bit map, wherein
   processing a first binary bit map of image data to generate a processed binary bit map comprises:
   processing the first binary bit map of image data to obtain a second binary bit map that identifies edge pixels of the image data; and
   generating a third binary bit map from the first and second binary bit maps;
   assigning an edge tag to at least one pixel in the processed binary bit map comprises:
   assigning an edge tag to at least one pixel in the third binary bit map based on a value of at least one corresponding pixel in the first binary bit map; and
   assigning a gray/color value to at least one pixel in the processed binary bit map based on values of corresponding pixels in the first binary bit map comprises:
   assigning a gray/color value to each pixel assigned an edge tag in the third binary bit map based on values of corresponding pixels in the first binary bit map.

2. A method according to claim 1, wherein processing the first binary bit map comprises:
   analyzing a value of a pixel and values of a plurality of other pixels in the first binary bit map; and changing a value of the pixel based on the value of the pixel and the values of the plurality of other pixels.

3. A method according to claim 2, wherein changing the value of the pixel based on the value of the pixel and the values of the plurality of other pixels comprises:
changing the value of the pixel from one to zero when at least one value of the plurality of other pixels is zero.

4. A method according to claim 3, further comprising:
leaving the value of the pixel unchanged when the value of the pixel is zero; and
leaving the value of the pixel unchanged when the value of the pixel is one and the value of each of the plurality of other pixels is one.

5. A method according to claim 2, wherein the plurality of other pixels are adjacent the pixel.

6. A method according to claim 5, wherein the pixel and the plurality of other pixels form a square.

7. A method according to claim 5, wherein the pixel and the plurality of other pixels form a cross.

8. A method according to claim 5, wherein the pixel and the plurality of other pixels form an x.

9. A method according to claim 2, wherein the plurality of other pixels includes at least one pixel that is not adjacent to the pixel.

10. A method according to claim 1, wherein assigning a gray/color value to each pixel assigned an edge tag comprises:
assigning a gray/color value that is proportional to the values of corresponding pixels in the first binary bit map.

11. A method for improving image quality of image data to be rendered, comprising:
processing a first binary bit map of image data to generate a processed binary bit map;
assigning an edge tag to at least one pixel in the processed binary bit map; and
assigning a gray/color value to at least one pixel in the processed binary bit map based on values of corresponding pixels in the first binary bit map,
wherein processing a first binary bit map of image data to generate a processed binary bit map comprises:
processing the first binary bit map to obtain a second binary bit map, a third binary bit map, a fourth binary bit map and a fifth binary bit map; and
processing the second, third, fourth and fifth binary bit maps to obtain a sixth binary bit map.

12. A method according to claim 11, wherein processing the first binary bit map to obtain the second, third, fourth and fifth binary bit maps comprises:
shifting the first binary bit map to obtain first, second, third and fourth shifted binary bit maps;
exclusively ORing the first shifted binary bit map with the first binary bit map to obtain the second binary bit map;
exclusively ORing the second shifted binary bit map with the first binary bit map to obtain the third binary bit map;
exclusively ORing the third shifted binary bit map with the first binary bit map to obtain the fourth binary bit map; and
exclusively ORing the fourth shifted binary bit map with the first binary bit map to obtain the fifth binary bit map.

13. A method according to claim 12, wherein shifting the first binary bit map to obtain the first, second, third and fourth shifted binary bit maps comprises:
shifting the first binary bit map up one pixel and left one pixel to obtain the first shifted binary bit map;
shifting the first binary bit map up one pixel and right one pixel to obtain the second shifted binary bit map;
shifting the first binary bit map down one pixel and left one pixel to obtain the third shifted binary bit map; and
shifting the first binary bit map down one pixel and right one pixel to obtain the fourth shifted binary bit map.

14. A method according to claim 11, wherein processing the second, third, fourth and fifth binary bit maps to obtain the sixth binary bit map comprises ORing the second, third, fourth and fifth binary bit maps.

15. A method according to claim 14, wherein assigning an edge tag comprises:
assigning a candidate edge tag to at least one pixel in the sixth binary bit map based on a value of at least one corresponding pixel in the first binary bit map; and
determining a final edge tag bit map based on the assignment of candidate edge tags.

16. A method according to claim 15, wherein assigning a gray/color value comprises:
assigning a gray/color value to each pixel assigned a candidate edge tag in the sixth binary bit map based on values of corresponding pixels in the first binary bit map.

17. A method according to claim 16, wherein determining a final edge tag bit map comprises:
eliminating any of the edge tags that correspond to pixels having a gray/color value of zero.

18. A computer readable medium including instructions readable by a computer, the instructions comprising:
instructions for processing a first binary bit map of image data to generate a processed binary bit map;
instructions for assigning an edge tag to at least one pixel in the processed binary bit map; and
instructions for assigning a gray/color value to at least one pixel in the processed binary bit map based on values of corresponding pixels in the first binary bit maps;
wherein processing a first binary bit map of image data to generate a processed binary bit map comprises:
processing the first binary bit map to obtain a second binary bit map, a third binary bit map, a fourth binary bit map and a fifth binary bit map; and
processing the second, third, fourth and fifth binary bit maps to obtain a sixth binary bit map.

19. A system for improving image quality of image data to be rendered, comprising:
an image data source that provides image data of an original image;
a processor that processes a first binary bit map of the image data provided by the image data source to generate a processed binary bit map, assigns an edge tag to at least one pixel in the processed binary bit map, and assigns a gray/color value to at least one pixel in the processed binary bit map based on values of corresponding pixels in the first binary bit map; and
an image rendering device that provides a rendered image of the original image based on the at least one assigned edge tag and the at least one assigned gray/color value,
wherein processing a first binary bit map of image data to generate a processed binary bit map comprises:
processing the first binary bit map to obtain a second binary bit map, a third binary bit map, a fourth binary bit map and a fifth binary bit map; and
processing the second, third, fourth and fifth binary bit maps to obtain a sixth binary bit map.

* * * * *